(12) United States Patent
Plante et al.

(10) Patent No.: US 8,868,288 B2
(45) Date of Patent: Oct. 21, 2014

(54) VEHICLE EXCEPTION EVENT MANAGEMENT SYSTEMS

(75) Inventors: James Plante, Del Mar, CA (US); Ramesh Kasavaraju, San Diego, CA (US); Gregory Mauro, La Jolla, CA (US); Andrew Nickerson, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 703 days.

(21) Appl. No.: 11/595,015

(22) Filed: Nov. 9, 2006

(65) Prior Publication Data

US 2008/0111666 A1    May 15, 2008

(51) Int. Cl.
| | |
|---|---|
| *G01M 17/00* | (2006.01) |
| *G06F 7/00* | (2006.01) |
| *G06F 19/00* | (2011.01) |
| *G07C 5/00* | (2006.01) |
| *G07C 5/08* | (2006.01) |

(52) U.S. Cl.
CPC ............. *G07C 5/085* (2013.01); *G07C 5/008* (2013.01)
USPC .............. 701/32.2; 701/1; 701/29.1; 340/436

(58) Field of Classification Search
USPC .............. 701/35, 1, 36, 117, 29.1, 32.2, 32.3, 701/33.4; 340/425.5, 903, 436
See application file for complete search history.

(56) References Cited

U.S. PATENT DOCUMENTS

| | | | |
|---|---|---|---|
| 673,203 A | 4/1901 | Freund | |
| 673,795 A | 5/1901 | Hammer | |
| 673,907 A | 5/1901 | Johnson | |
| 676,075 A | 6/1901 | Mcdougall | |
| 679,511 A | 7/1901 | Richards | |
| 681,036 A | 8/1901 | Burg | |
| 681,283 A | 8/1901 | Waynick | |

(Continued)

FOREIGN PATENT DOCUMENTS

| | | | |
|---|---|---|---|
| CA | 2469728 A1 | 12/2005 | |
| CA | 2692415 A1 | 8/2011 | |

(Continued)

OTHER PUBLICATIONS

Adaptec published and sold its VideoOh! DVD software USB 2.0 Edition in at least Jan. 24, 2003.

(Continued)

*Primary Examiner* — Rami Khatib
(74) *Attorney, Agent, or Firm* — Pillsbury Winthrop Shaw Pittman LLP

(57) ABSTRACT

Exception event recorders and analysis systems include: vehicle mounted sensors arranged as a vehicle event recorder to capture both discrete and non-discrete data; a discretization facility; a database; and an analysis server all coupled together as a computer network. Motor vehicles with video cameras and onboard diagnostic systems capture data when the vehicle is involved in a crash or other anomaly (an 'event'). In station where interpretation of non-discrete data is rendered, i.e. a discretization facility, captured data is used as a basis for production of supplemental discrete data to further characterize the event. Such interpreted data is joined to captured data and inserted into a database in a structure which is searchable and which supports logical or mathematical analysis by automated machines. A coupled analysis server is arranged to test stored data for prescribed conditions and upon finding such, to initiate further actions appropriate for the detected condition.

20 Claims, 9 Drawing Sheets

(56) References Cited

U.S. PATENT DOCUMENTS

| | | | |
|---|---|---|---|
| 681,998 A | 9/1901 | Swift | |
| 683,155 A | 9/1901 | Thompson | |
| 683,214 A | 9/1901 | Mansfield | |
| 684,276 A | 10/1901 | Lonergan | |
| 685,082 A | 10/1901 | Wood | |
| 685,969 A | 11/1901 | Campbell | |
| 686,545 A | 11/1901 | Selph | |
| 689,849 A | 12/1901 | Brown | |
| 691,982 A | 1/1902 | Sturgis | |
| 692,834 A | 2/1902 | Davis | |
| 694,781 A | 3/1902 | Prinz | |
| 2,943,141 A | 6/1960 | Knight | |
| 3,634,866 A | 1/1972 | Meyer | |
| 3,781,824 A | 12/1973 | Caiati | |
| 3,812,287 A | 5/1974 | Lemelson | |
| 3,885,090 A | 5/1975 | Rosenbaum | |
| 3,992,656 A | 11/1976 | Joy | |
| 4,054,752 A | 10/1977 | Dennis | |
| 4,271,358 A | 6/1981 | Schwarz | |
| 4,276,609 A | 6/1981 | Patel | |
| 4,280,151 A | 7/1981 | Tsunekawa | |
| 4,281,354 A | 7/1981 | Conte | |
| 4,401,976 A | 8/1983 | Stadelmayr | |
| 4,409,670 A | 10/1983 | Herndon | |
| 4,420,773 A | 12/1983 | Toyoda | |
| 4,425,097 A | 1/1984 | Owens | |
| 4,456,931 A | 6/1984 | Toyoda | |
| 4,489,351 A | 12/1984 | D | |
| 4,496,995 A | 1/1985 | Colles | |
| 4,500,868 A | 2/1985 | Tokitsu | |
| 4,528,547 A | 7/1985 | Rodney | |
| 4,533,962 A | 8/1985 | Decker | |
| 4,558,379 A | 12/1985 | Hutter | |
| 4,588,267 A | 5/1986 | Pastore | |
| 4,593,313 A | 6/1986 | Nagasaki | |
| 4,621,335 A | 11/1986 | Bluish | |
| 4,625,210 A | 11/1986 | Sagl | |
| 4,630,110 A | 12/1986 | Cotton | |
| 4,632,348 A | 12/1986 | Keesling | |
| 4,638,289 A | 1/1987 | Zottnik | |
| 4,646,241 A | 2/1987 | Ratchford | |
| 4,651,143 A | 3/1987 | Yamanaka | |
| 4,671,111 A | 6/1987 | Lemelson | |
| 4,718,685 A | 1/1988 | Kawabe | |
| 4,754,255 A | 6/1988 | Sanders | |
| 4,758,888 A | 7/1988 | Lapidot | |
| 4,763,745 A * | 8/1988 | Eto et al. | 180/422 |
| 4,785,474 A | 11/1988 | Bernstein | |
| 4,789,904 A | 12/1988 | Peterson | |
| 4,794,566 A | 12/1988 | Richards | |
| 4,804,937 A | 2/1989 | Barbiaux | |
| 4,806,931 A | 2/1989 | Nelson | |
| 4,807,096 A | 2/1989 | Skogler | |
| 4,814,896 A | 3/1989 | Heitzman | |
| 4,837,628 A | 6/1989 | Sasaki | |
| 4,839,631 A | 6/1989 | Tsuji | |
| 4,843,463 A | 6/1989 | Michetti | |
| 4,843,578 A | 6/1989 | Wade | |
| 4,853,856 A | 8/1989 | Hanway | |
| 4,853,859 A | 8/1989 | Morita | |
| 4,866,616 A | 9/1989 | Takeuchi | |
| 4,876,597 A | 10/1989 | Roy | |
| 4,883,349 A | 11/1989 | Mittelhauser | |
| 4,896,855 A | 1/1990 | Furnish | |
| 4,926,331 A | 5/1990 | Windle | |
| 4,930,742 A | 6/1990 | Schofield | |
| 4,936,533 A | 6/1990 | Adams | |
| 4,939,652 A | 7/1990 | Steiner | |
| 4,942,464 A | 7/1990 | Milatz | |
| 4,945,244 A | 7/1990 | Castleman | |
| 4,949,186 A | 8/1990 | Peterson | |
| 4,980,913 A | 12/1990 | Skret | |
| 4,987,541 A | 1/1991 | Levente | |
| 4,992,943 A | 2/1991 | McCracken | |
| 5,012,335 A | 4/1991 | Cohodar | |
| 5,027,104 A | 6/1991 | Reid | |
| 5,046,007 A | 9/1991 | McCrery | |
| 5,050,166 A | 9/1991 | Cantoni | |
| 5,056,056 A | 10/1991 | Gustin | |
| 5,057,820 A | 10/1991 | Markson | |
| 5,096,287 A | 3/1992 | Kakinami | |
| 5,100,095 A | 3/1992 | Haan | |
| 5,111,289 A | 5/1992 | Lucas | |
| 5,140,434 A | 8/1992 | Van | |
| 5,140,436 A | 8/1992 | Blessinger | |
| 5,140,438 A | 8/1992 | Kurahashi | |
| 5,144,661 A | 9/1992 | Shamosh | |
| 5,178,448 A | 1/1993 | Adams | |
| 5,185,700 A | 2/1993 | Bezos | |
| 5,196,938 A | 3/1993 | Blessinger | |
| 5,223,844 A | 6/1993 | Mansell | |
| 5,224,211 A | 6/1993 | Roe | |
| 5,262,813 A | 11/1993 | Scharton | |
| 5,283,433 A | 2/1994 | Tsien | |
| 5,305,214 A | 4/1994 | Komatsu | |
| 5,305,216 A | 4/1994 | Okura | |
| 5,308,247 A | 5/1994 | Dyrdek | |
| 5,309,485 A | 5/1994 | Chao | |
| 5,311,197 A | 5/1994 | Sorden | |
| 5,321,753 A | 6/1994 | Gritton | |
| 5,327,288 A | 7/1994 | Wellington | |
| 5,330,149 A | 7/1994 | Haan | |
| 5,333,759 A | 8/1994 | Deering | |
| 5,343,527 A | 8/1994 | Moore | |
| 5,353,023 A | 10/1994 | Mitsugi | |
| 5,361,326 A | 11/1994 | Aparicio | |
| 5,387,926 A | 2/1995 | Bellan | |
| 5,388,045 A | 2/1995 | Kamiya | |
| 5,388,208 A | 2/1995 | Weingartner | |
| 5,404,330 A | 4/1995 | Lee | |
| 5,408,330 A | 4/1995 | Squicciarini | |
| 5,422,543 A | 6/1995 | Weinberg | |
| 5,430,431 A | 7/1995 | Nelson | |
| 5,430,432 A | 7/1995 | Camhi | |
| 5,435,184 A | 7/1995 | Pineroli | |
| 5,445,024 A | 8/1995 | Riley | |
| 5,445,027 A | 8/1995 | Zorner | |
| 5,446,659 A | 8/1995 | Yamawaki | |
| 5,455,625 A | 10/1995 | Englander | |
| 5,455,716 A | 10/1995 | Suman | |
| 5,465,079 A | 11/1995 | Bouchard | |
| 5,473,729 A | 12/1995 | Bryant | |
| 5,477,141 A | 12/1995 | Nather | |
| 5,495,242 A | 2/1996 | Kick | |
| 5,495,243 A | 2/1996 | McKenna | |
| 5,497,419 A | 3/1996 | Hill | |
| 5,499,182 A * | 3/1996 | Ousborne | 701/35 |
| 5,504,482 A | 4/1996 | Schreder | |
| 5,513,011 A | 4/1996 | Matsumoto | |
| 5,515,285 A | 5/1996 | Garrett | |
| 5,521,633 A | 5/1996 | Nakajima | |
| 5,523,811 A | 6/1996 | Wada | |
| 5,526,269 A | 6/1996 | Ishibashi | |
| 5,530,420 A | 6/1996 | Tsuchiya | |
| 5,537,156 A | 7/1996 | Katayama | |
| 5,539,454 A | 7/1996 | Williams | |
| 5,541,590 A | 7/1996 | Nishio | |
| 5,544,060 A | 8/1996 | Fujii | |
| 5,546,191 A | 8/1996 | Hibi | |
| 5,546,305 A | 8/1996 | Kondo | |
| 5,548,273 A | 8/1996 | Nicol | |
| 5,552,990 A | 9/1996 | Ihara | |
| 5,559,496 A | 9/1996 | Dubats | |
| 5,568,211 A | 10/1996 | Bamford | |
| 5,570,087 A | 10/1996 | Lemelson | |
| 5,570,127 A | 10/1996 | Schmidt | |
| 5,574,424 A | 11/1996 | Nguyen | |
| 5,574,443 A | 11/1996 | Hsieh | |
| D376,571 S | 12/1996 | Kokat | |
| 5,581,464 A | 12/1996 | Woll | |
| 5,586,130 A | 12/1996 | Doyle | |
| 5,590,948 A | 1/1997 | Moreno | |
| 5,596,382 A | 1/1997 | Bamford | |
| 5,600,775 A | 2/1997 | King | |

(56) References Cited

U.S. PATENT DOCUMENTS

| | | |
|---|---|---|
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai et al. |
| 5,680,123 A | 10/1997 | Lee |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,712,679 A | 1/1998 | Coles |
| 5,717,456 A | 2/1998 | Rudt |
| 5,719,554 A | 2/1998 | Gagnon |
| 5,781,145 A | 7/1998 | Williams |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A * | 9/1998 | Kikinis ..................... 340/937 |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van Ryzin |
| 5,877,897 A | 3/1999 | Schofield |
| 5,896,167 A | 4/1999 | Omae |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,049,079 A | 4/2000 | Noordam |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox et al. |
| 6,092,008 A | 7/2000 | Bateman |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A * | 10/2000 | Mackey et al. ............... 701/35 |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,167,186 A | 12/2000 | Kawasaki |
| 6,181,373 B1 | 1/2001 | Coles |
| 6,185,490 B1 * | 2/2001 | Ferguson .................... 701/35 |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 * | 6/2001 | Bague ....................... 701/35 |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,298,290 B1 | 10/2001 | Abe et al. |
| 6,300,875 B1 | 10/2001 | Schafer |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,389,339 B1 | 5/2002 | Just |
| 6,389,340 B1 | 5/2002 | Rayner |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese et al. |
| 6,493,650 B1 | 12/2002 | Rodgers |
| 6,505,106 B1 | 1/2003 | Lawrence |
| 6,507,838 B1 | 1/2003 | Syeda-Mahmood |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt et al. |
| 6,559,769 B2 | 5/2003 | Anthony |
| 6,575,902 B1 | 6/2003 | Burton |
| 6,580,983 B2 | 6/2003 | Laguer-Diaz |
| 6,594,576 B2 | 7/2003 | Fan |
| 6,611,740 B2 | 8/2003 | Lowrey et al. |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,728,612 B1 | 4/2004 | Carver et al. |
| 6,732,031 B1 | 5/2004 | Lowrey |
| 6,732,032 B1 | 5/2004 | Banet et al. |
| 6,735,503 B2 | 5/2004 | Ames |

(56) References Cited

U.S. PATENT DOCUMENTS

| | | | |
|---|---|---|---|
| 6,737,954 B2 | 5/2004 | Chainer et al. |
| 6,738,697 B2 | 5/2004 | Breed |
| 6,739,078 B2 | 5/2004 | Morley et al. |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg et al. |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Oda |
| 6,810,362 B2 | 10/2004 | Adachi et al. |
| 6,812,831 B2 | 11/2004 | Ikeda |
| 6,819,989 B2 | 11/2004 | Maeda et al. |
| 6,831,556 B1 | 12/2004 | Boykin |
| 6,832,140 B2 | 12/2004 | Fan |
| 6,832,141 B2 | 12/2004 | Skeen et al. |
| 6,836,712 B2 | 12/2004 | Nishina |
| 6,842,762 B2 | 1/2005 | Raither et al. |
| 6,847,873 B1 | 1/2005 | Li |
| 6,850,823 B2 | 2/2005 | Eun et al. |
| 6,859,695 B2 | 2/2005 | Klausner |
| 6,862,524 B1 | 3/2005 | Nagda |
| 6,865,457 B1 | 3/2005 | Mittelsteadt et al. |
| 6,867,733 B2 | 3/2005 | Sandhu |
| 6,873,261 B2 | 3/2005 | Anthony |
| 6,882,313 B1 | 4/2005 | Fan |
| 6,894,606 B2 | 5/2005 | Forbes |
| 6,895,248 B1 | 5/2005 | Akyol |
| 6,898,492 B2 | 5/2005 | de Leon et al. |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner et al. |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,272,179 B2 | 9/2007 | Siemens |
| 7,308,341 B2 | 12/2007 | Schofield |
| 7,317,974 B2 | 1/2008 | Luskin |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 * | 6/2008 | Basir et al. ..................... 701/35 |
| 7,389,178 B2 | 6/2008 | Raz |
| 7,457,693 B2 | 11/2008 | Olsen |
| 7,536,457 B2 | 5/2009 | Miller |
| 7,561,054 B2 | 7/2009 | Raz |
| 7,623,754 B1 | 11/2009 | McKain |
| 7,659,827 B2 | 2/2010 | Gunderson |
| 7,667,731 B2 | 2/2010 | Kreiner |
| 7,702,442 B2 | 4/2010 | Takenaka |
| 7,768,548 B2 | 8/2010 | Silvernail |
| 7,804,426 B2 | 9/2010 | Etcheson |
| 7,821,421 B2 | 10/2010 | Tamir |
| 7,853,376 B2 | 12/2010 | Peng |
| 7,974,748 B2 | 7/2011 | Goerick |
| 8,140,358 B1 | 3/2012 | Ling |
| 8,311,858 B2 | 11/2012 | Everett |
| 8,314,708 B2 | 11/2012 | Gunderson |
| 8,321,066 B2 | 11/2012 | Becker |
| 8,508,353 B2 | 8/2013 | Cook |
| 8,564,446 B2 | 10/2013 | Gunderson |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0087240 A1 | 7/2002 | Raithel |
| 2002/0091473 A1 | 7/2002 | Gardner et al. |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0163532 A1 | 11/2002 | Thomas |
| 2002/0169529 A1 | 11/2002 | Kim |
| 2002/0169530 A1 | 11/2002 | Laguer Diaz et al. |
| 2002/0183905 A1 | 12/2002 | Maeda et al. |
| 2003/0016753 A1 | 1/2003 | Kim |
| 2003/0028298 A1 * | 2/2003 | Macky et al. ..................... 701/35 |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0154009 A1 * | 8/2003 | Basir et al. ..................... 701/35 |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer et al. |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0070926 A1 | 4/2004 | Boykin et al. |
| 2004/0083041 A1 | 4/2004 | Skeen et al. |
| 2004/0088090 A1 * | 5/2004 | Wee ..................... 701/35 |
| 2004/0103008 A1 | 5/2004 | Wahlbin |
| 2004/0103010 A1 | 5/2004 | Wahlbin |
| 2004/0111189 A1 | 6/2004 | Miyazawa |

(56) References Cited

U.S. PATENT DOCUMENTS

| | | |
|---|---|---|
| 2004/0135979 A1 | 7/2004 | Hazelton |
| 2004/0138794 A1 | 7/2004 | Saito et al. |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0209594 A1 | 10/2004 | Naboulsi |
| 2004/0210353 A1 | 10/2004 | Rice |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao et al. |
| 2005/0100329 A1 | 5/2005 | Lao et al. |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0092043 A1 | 5/2006 | Lagassey |
| 2006/0095175 A1 | 5/2006 | deWaal et al. |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0142913 A1 | 6/2006 | Coffee |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0209840 A1 | 9/2006 | Paatela |
| 2006/0212195 A1 | 9/2006 | Veith |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0100509 A1 | 5/2007 | Piekarz |
| 2007/0120948 A1 | 5/2007 | Fujioka |
| 2007/0124332 A1 | 5/2007 | Ballesty |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0059019 A1 | 3/2008 | Delia |
| 2008/0111666 A1 | 5/2008 | Plante |
| 2008/0143834 A1 | 6/2008 | Comeau |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0252485 A1 | 10/2008 | Lagassey |
| 2008/0269978 A1 | 10/2008 | Shirole |
| 2008/0281485 A1 | 11/2008 | Plante |
| 2009/0043971 A1 | 2/2009 | Kim |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2010/0045451 A1 | 2/2010 | Periwal |
| 2010/0063672 A1 | 3/2010 | Anderson |
| 2010/0063850 A1 | 3/2010 | Daniel |
| 2010/0070175 A1 | 3/2010 | Soulchin |
| 2010/0085193 A1 | 4/2010 | Boss |
| 2010/0085430 A1 | 4/2010 | Kreiner |

(56) References Cited

U.S. PATENT DOCUMENTS

| | | |
|---|---|---|
| 2010/0087984 A1 | 4/2010 | Joseph |
| 2010/0153146 A1 | 6/2010 | Angell |
| 2010/0157061 A1 | 6/2010 | Katsman |
| 2010/0220892 A1 | 9/2010 | Kawakubo |
| 2010/0250021 A1 | 9/2010 | Cook |
| 2010/0268415 A1 | 10/2010 | Ishikawa |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0121960 A1 | 5/2011 | Tsai |
| 2011/0125365 A1 | 5/2011 | Larschan |
| 2011/0130916 A1 | 6/2011 | Mayer |
| 2011/0173015 A1 | 7/2011 | Chapman |
| 2011/0224891 A1 | 9/2011 | Iwuchukwu |
| 2011/0273568 A1 | 11/2011 | Lagassey |
| 2011/0304446 A1 | 12/2011 | Basson |
| 2012/0035788 A1 | 2/2012 | Trepagnier |
| 2012/0046803 A1 | 2/2012 | Inou |
| 2012/0071140 A1 | 3/2012 | Oesterling |
| 2012/0100509 A1 | 4/2012 | Gunderson |
| 2013/0006469 A1 | 1/2013 | Green |

FOREIGN PATENT DOCUMENTS

| | | |
|---|---|---|
| DE | 4416991 A1 | 11/1995 |
| DE | 20311262 | 9/2003 |
| DE | 202005008238 | 9/2005 |
| DE | 102004004669 A1 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| GB | 2268608 A | 1/1994 |
| GB | 2402530 A | 12/2004 |
| GB | 2447184 B | 6/2011 |
| JP | 5885110 A | 5/1983 |
| JP | 58085110 | 5/1983 |
| JP | 6291092 A | 4/1987 |
| JP | 62091092 | 4/1987 |
| JP | 62166135 A | 7/1987 |
| JP | 0256197 A | 2/1990 |
| JP | 02056197 | 2/1990 |
| JP | 04257189 A | 9/1992 |
| JP | 05137144 A | 6/1993 |
| JP | 5294188 | 11/1993 |
| JP | 08124069 A | 5/1996 |
| JP | 09163357 A | 6/1997 |
| JP | 09272399 A | 10/1997 |
| JP | 1076880 A | 3/1998 |
| JP | 10076880 | 3/1998 |
| JP | 2002191017 A | 7/2002 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 2006022824 A2 | 3/2006 |
| WO | 2011055743 A1 | 5/2011 |

OTHER PUBLICATIONS

Ambulance Companies Use Video Technology to Improve Driving Behavior, Ambulance Industry Journal, Spring 2003.
Amended Complaint for Patent Infringement, Trade Secret Misappropriation, Unfair Competition and Conversion in *DriveCam, Inc.* v. *SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc.* v. *SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/flash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit a, U.S. Patent 6,389,340, Document 34.1, Oct. 20, 2011.
DriveCam, Inc.'s Infringement Contentions Exhibit B, U.S. Patent 7,659,827. Aug. 19, 2011.
DriveCam, Inc.'s Infringement Contentions Exhibit B, U.S. Patent 7,804,426, Document 34.2, Oct. 20, 2011.
DriveCam, Inc.'s Infringement Contentions Exhibit C, U.S. Patent 7,659,827, Document 34.3, Oct. 20, 2011.
DriveCam, Inc.'s Infringement Contentions Exhibit C, U.S. Patent 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc.* v.

(56) References Cited

OTHER PUBLICATIONS

*SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11 -CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Categorysub.--Code=coaching)., printed from site on Jan. 11, 2012.
Interior Camera Data Sheet, Oct. 26, 2001.
International Search Report and Written Opinion issued in PCT/US07/68325 on Feb. 27, 2008.
International Search Report and Written Opinion issued in PCT/US07/68328 on Oct. 15, 2007.
International Search Report and Written Opinion issued in PCT/US07/68329 on Mar. 3, 2008.
International Search Report and Written Opinion issued in PCT/US07/68332 on Mar. 3, 2008.
International Search Report and Written Opinion issued in PCT/US07/68334 on Mar. 5, 2008.
International Search Report for PCT/US2006/47055, Mailed Mar. 20, 2008 (2 pages).
International Search Report issued in PCT/US2006/47042 mailed Feb. 25, 2008.
J. Gallagher, 'Lancer Recommends Tech Tool', Insurance and Technology Magazine, Feb. 2002.
Jean (DriveCam vendor), 'DC Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Patent No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Patent No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infrared Image Sequence for Night Vision Applications, IEEE Workshop on Applications of Computer Vision (WACV '07), Feb. 2007, pp. 8-8; Digital Object Identifier 10.1109/WACV.2007.20.
JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.
Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Non-Final Office Action for U.S. Appl. No. 11/296,907, Mailed Mar. 22, 2007 (17 pages).

(56) References Cited

OTHER PUBLICATIONS

Non-final Office Action mailed Aug. 27, 2009 during prosecution of U.S. Appl. No. 11/566,424.
Non-Final Office Action mailed Nov. 27, 2013 in U.S. Appl. No. 13/957,810, filed Aug. 2, 2013.
Panasonic Corporation, Video Cassette Recorder (VCR) Operating Instructions for Models No. PV-V4020/PV-V4520. Apr. 1998.
Passenger Transportation Mode Brochure, May 2, 2005.
Patent Abstracts of Japan vol. 007, No. 180 (P-215), Aug. 9, 1983 JP 58 085110 A (Mitsuhisa Ichikawa), May 21, 1983.
Patent Abstracts of Japan vol. 011, No. 292 (E-543), Sep. 19, 1987 JP 62 091092 A (OK ENG:KK), Apr. 25, 1987.
Patent Abstracts of Japan vol. 012, No. 001 (M-656), Jan. 6, 1988 JP 62 166135 A (Fuji Electric Co Ltd), Jul. 22, 1987.
Patent Abstracts of Japan vol. 014, No. 222 (E-0926), May 10, 1990 JP 02 056197 A (Sanyo Electric Co Ltd), Feb. 26, 1990.
Patent Abstracts of Japan vol. 017, No. 039 (E-1311), Jan. 25, 1993 JP 04 257189 A (Sony Corp), Sep. 11, 1992.
Patent Abstracts of Japan vol. 017, No. 521 (E-1435), Sep. 20, 1993 JP 05 137144 A (Kyocera Corp), Jun. 1, 1993.
Patent Abstracts of Japan vol. 1996, No. 09, Sep. 30, 1996 JP 08 124069 A (Toyota Motor Corp), May 17, 1996.
Patent Abstracts of Japan vol. 1997, No. 10, Oct. 31, 1997 JP 09 163357 A (Nippon Soken Inc), Jun. 20, 1997.
Patent Abstracts of Japan vol. 1998, No. 02, Jan. 30, 1998 JP 09 272399 A (Nippon Soken Inc), Oct. 21, 1997.
Patent Abstracts of Japan vol. 1998, No. 8, Jun. 30, 1998 JP 10 076880 A (Muakami Corp), Mar. 24, 1998.
PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
Preliminary Claim Construction and Identification of Extrinsic Evidence of Defendant/Counterclaimant *SmartDriveSystems, Inc.'* in *DriveCam, Inc.* v. *SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, S014246-S014255, Nov. 16, 2011.
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php? t=51&sid=1184fbbcbe3be5c87ffa0f2ee6e2da76), printed from site on Jan. 11, 2012.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 11/297,669, mailed Apr. 28, 2011, 11 pages.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 on Oct. 15, 2007.
Written Opinion of the International Searching Authority for PCT/US2006/47042. Mailed Feb. 25, 2008 (5 pages).
Written Opinion of the International Searching Authority for PCT/US2006/47055, Mailed Mar. 20, 2008 (5 pages).

\* cited by examiner

VEHICLE EXCEPTION EVENT MANAGEMENT SYSTEMS

BACKGROUND OF THE INVENTIONS

1. Field

The following invention disclosure is generally concerned with vehicle event recorders and more specifically concerned with recording systems including a video discretization facility and operation arranged to create discrete data relating to video image series and associate that discrete data with other digital data associated with the event in a database record.

2. Prior Art

The inventions presented in U.S. Pat. No. 6,947,817 by inventor Diem for nonintrusive diagnostic tools for testing oxygen sensor operation relates to a diagnostic system for testing a vehicle where such systems include a wireless communications link between a vehicle any remote network of server computers. In particular, a WiFi type access points allowed an analyzer to communicate by way the Internet with a server computer hosting and oxygen sensor SOAP (simple object access protocol) service. In a nutshell, the system relates to smog sensors for automobiles which communicate with remote servers by way of a WiFi communications links.

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller in nonvolatile memory, and an accident sensing interrupter. The oldest memory is overwritten by the newest images, until an accident is detected at which time the memory is blocked from further overwrites to protect the more vital images, which may include important information about the accident. Mr. Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interface.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'Drive-Cam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Remote reporting and manipulation of automobile systems is not entirely new. The following are very important teachings relating to some automobile systems having a wireless communications link component.

Inventors Fan et al, teach inventions of methods and systems for detecting vehicle collision using global positioning system GPS. The disclosure of Jun. 12, 2001 resulted in granted patent having U.S. Pat. No. 6,459,988. A GPS receiver is combined with wireless technology to automatically report accident and third parties remotely located. A system uses the GPS signals to determine when an acceleration value exceeds the preset threshold which is meant to be indicative of an accident having occurred.

Of particular interest include inventions presented by inventors Nagda et al., in the document numbered U.S. Pat. No. 6,862,524 entitled using location data to determine trafficking route information. In this system for determining and disseminating traffic information or route information, traffic condition information is collected from mobile units that provide their location or position information. Further route information may be utilized to determine whether a mobile unit is allowed or prohibited from traveling along a certain route.

A common assignee, @Road Inc., owns the preceding two patents in addition to the following: U.S. Pat. Nos. 6,529,159; 6,552,682; 6,594,576; 6,664,922; 6,795,017; 6,832,140; 6,867,733; 6,882,313; and 6,922,566. As such, @Road Inc., must be considered a major innovator in position technologies arts as they relate to mobile vehicles and remote server computers.

General Motors Corp. teaches in U.S. Pat. No. 6,728,612, an automated telematics test system and method. The invention provides a method and system testing a telematics system in a mobile vehicle a test command from a test center to a call center is based on a test script. The mobile vehicle is continuously in contact by way of cellular communication networks with a remotely located host computer.

Inventor Earl Diem and Delphi Technologies Inc., had granted to them on Sep. 20, 2005, U.S. Pat. No. 6,947,817. The nonintrusive diagnostic tool for sensing oxygen sensor operation include a scheme or an oxygen analyzer deployed in a mobile vehicle communicates by way of an access point to a remotely located server. A diagnostic heuristic is used to analyze the data and confirm proper operation of the sensor. Analysis may be performed by a mainframe computer quickly note from the actual oxygen sensor.

Similar patents including special relationships between mobile vehicles and remote host computers include those presented by various inventors in U.S. Pat. Nos. 6,735,503; 6,739,078; 6,760,757; 6,810,362; 6,832,141; and 6,850,823.

Another special group of inventions owned by Reynolds and Reynolds Holding Inc., is taught first by Lightner et al, in U.S. Pat. No. 6,928,348 issued Aug. 9, 2005. In these inventions, Internet based emission tests are performed on vehicles having special wireless couplings to computer networks. Data may be further transferred to entities of particular interest including the EPA or California Air Resources Board, for example, or particular insurance companies and other organizations concerned with vehicle emissions and environment.

Other patents held by Reynolds and Reynolds Holding Inc., include those relating to reporting of automobile performance parameters to remote servers via wireless links. Specifically, an onboard data bus OBD system is coupled to a microprocessor, by way of a standard electrical connector.

The microprocessor periodically receives data and transmits it into the wireless communications system. This information is more fully described in U.S. patent granted Oct. 21, 2003 U.S. Pat. No. 6,636,790. Inventors Lightner et al, present method and apparatus for remotely characterizing the vehicle performance. Data at the onboard data by his periodically received by a microprocessor and passed into a local transmitter. The invention specifically calls out transmission of data on a predetermined time interval. Thus these inventions do not anticipate nor include processing and analysis steps which result in data being passed at time other than expiration of the predetermined time period.

Reynolds and Reynolds Holding Inc., further describes systems where motor vehicles are coupled by wireless communications links to remote host servers in U.S. Pat. No. 6,732,031.

Additionally, recent developments are expressed in application for U.S. patent having document number: 2006/0095175 published on May 4, 2006. This disclosure describes a comprehensive systems having many important components. In particular, deWaal et al presents a 'crash survivable apparatus' in which information may be processed and recorded for later transmission into related coupled systems. An ability to rate a driver performance based upon data captured is particular feature described is some detail.

Also, inventor Boykin of Mt. Juliet Tenn. presents a "composite mobile digital information system" in U.S. Pat. No. 6,831,556. In these systems, a mobile server capable of transmitting captured information from a vehicle to a second location such as a building is described. In particular, a surveillance system for capturing video, audio, and data information is provided in a vehicle.

Inventors Lao et al, teach in their publication numbered 2005/0099498 of a "Digital Video System-Intelligent Information Management System" which is another application for U.S. patent published May 12, 2005. A digital video information management system for monitoring and managing a system of digital collection devices is specified. A central database receives similar information from a plurality of distributed coupled systems. Those distributed systems may also be subject to reset and update operations via the centralized server.

Finally, "Mobile and Vehicle-Based Digital Video System" is the title of U.S. patent application disclosure publication numbered 2005/0100329 also published on May 12, 2005. It also describes a vehicle based video capture and management system with digital recording devices optimized for field use. Because these systems deploy non-removable media for memory, they are necessarily coupled to data handling systems via various communications links to convey captured data to analysis servers.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of the inventions taught herefollowing.

SUMMARY OF THESE INVENTIONS

Comes now: James Plante; Gregory Mauro; Ramesh Kasavaraju; and Andrew Nickerson, with inventions of data processing, recording and analysis systems for use in conjunction with vehicle event recorders. An 'exception event' occurs whenever an extraordinary condition arises during normal use of a motor vehicle. Upon declaration of such exception event, or hereinafter simply 'event', information is recorded at the vehicle—in particular, information relating to vehicle and operator performance and the state of the environments about the vehicle.

Accordingly, systems first presented herein are arranged to capture, record, interpret, and analyze information relating to or arising from vehicle use. In particular, both discrete and non-discrete types of information are captured by various vehicle mounted sensors in response an event having been declared, via an event trigger. Non-discrete data is passed to and processed by a discretization facility where it is used to produce an interpreted dataset then associated and recombined with original captured data thus forming a complete event dataset.

Analysis can then be taken up against these complete datasets which include interpreted data where analysis results are used to drive automated actions in related coupled systems. Accordingly, those actions depend upon: interpreted information processed in the discretization facility; discrete data captured at the vehicle event recorder; and combinations thereof.

An analysis server is provided to run database queries which depend upon both the discrete data, and interpreted data as both of these are in machine processable form. The analysis server is therefore enabled with greater functionality as its information base is considerably broadened to include that which would not otherwise be processable by automated machines. The analysis server is arranged to initiate actions in response to detection of certain conditions in the event database. These may be actions which depend on a single event record, or a plurality of event records. The following examples illustrate this point thoroughly.

A vehicle event recorder having a suitable event trigger captures video and numeric data in response to a detected impact or impulse force. Numeric information collected by the plurality of vehicle subsystem sensors is insufficient to fully characterize the nature of the event. However, upon review of video and audio information captured by an expert event interpreter, various important aspects of the event can be specified in a discrete way. For example, it can be determined that the impact should be characterized as a "curb strike" type impact where a single front wheel made excessive contact with the roadway edge or other object. The interpreter's review is expressed via a graphical user interface system particularly designed for this purpose. These graphical user interfaces are comprised of control objects which can be set to various values which reflect the interpretation. As such, the control object value state having been manipulated by an interpreter after reviewing non-discrete data, may be associated with a particular event and stored in a database where it may be read by a machine in an analysis step. For example, in a general daily review of vehicle activity, a computer (analysis server) determines that a curb strike has occurred. Further, the analysis server considers the degree of severity by further analyzing force data and finally determines a maintenance action is necessary and orders a front-end alignment action be performed on the vehicle. The analysis server transmits the order (for example via e-mail) to the fleet maintenance department. Upon the next occasion where the vehicle is in for maintenance, the necessary alignment will be executed.

In a second illustrative example an analysis server reads a plurality of event records. This time, an action initiated by the analysis server is directed not to a vehicle, but rather to a vehicle operator. This may be the case despite the fact that a single operator may have operated many different vehicles of a vehicle fleet to bring about several event records; each event record having an association with the operator in question. An analysis server may produce a query to identify all of the events which are characterized as "excess idle time" type events associated with any single operator. When a vehicle is left idling for extended periods, the operation efficiency of the vehicle is reduced. Accordingly, fleet managers discourage employee operators from extended idling periods. However, under some conditions, extended idling is warranted. For example where a school bus is loading children in an extremely cold weather, it is necessary to run the engine to generate heat for the bus interior. It is clear that an excess idling type event should only be declared after careful interpretation of non-discrete video data. Discrete data produced by vehicle subsystem detectors may be insufficient to properly declare all excess idling type events. Whenever a single operator has accumulated excess idling events at a rate beyond a predetermined threshold, for example three per month, the analysis server can automatically detect such conditions. Upon detection, the analysis server can take action to order a counseling session between a fleet manager and the operator in question. In this way, automated systems which depend upon interpreted data are useful for managing operations of fleet vehicles.

Vehicle event recorders combine capture of non-discrete information including images and audio as well as discrete digital or numeric data. Information is passed to a specialized processing station or discretization facility including a unique event record media player arranged to playback a very specific event dataset and graphical user interface arranged with special controls having adjustable states.

These systems are further coupled to databases which support storage of records having a structure suitable to accommodate these event records as described. In addition, these database records are coupled to the controls of the graphical user interface via control present value states. Finally, these systems are also comprised of analysis servers which interrogate the database to determine when various conditions are met and to initiate actions in response thereto.

Objectives of these Inventions

It is a primary object of these inventions to provide information processing systems for use with vehicle event recorders.

It is an object of these inventions to provide advanced analysis on non-discrete data captured in vehicle event recorders.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

Figure 3:
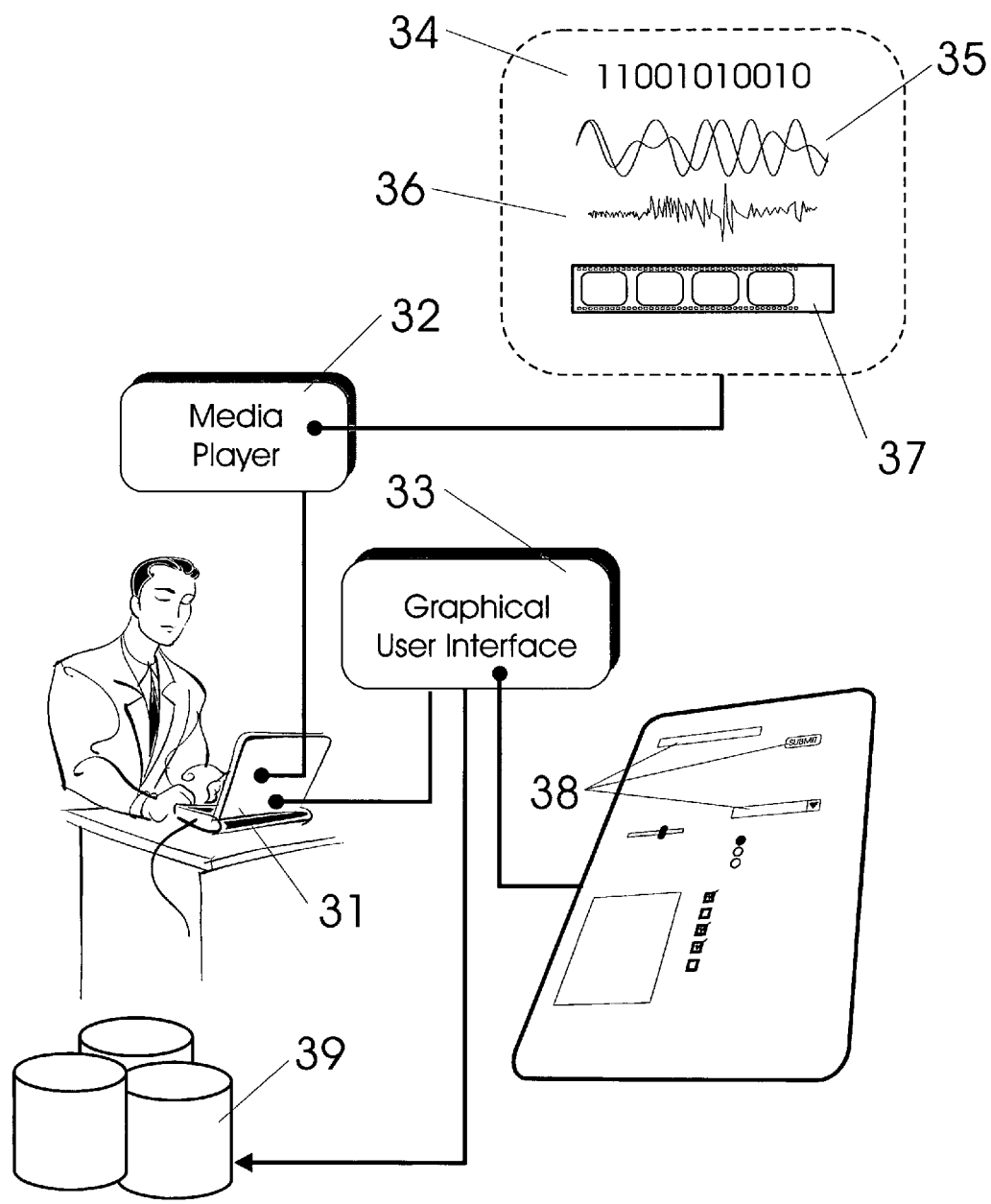
Figure 4:
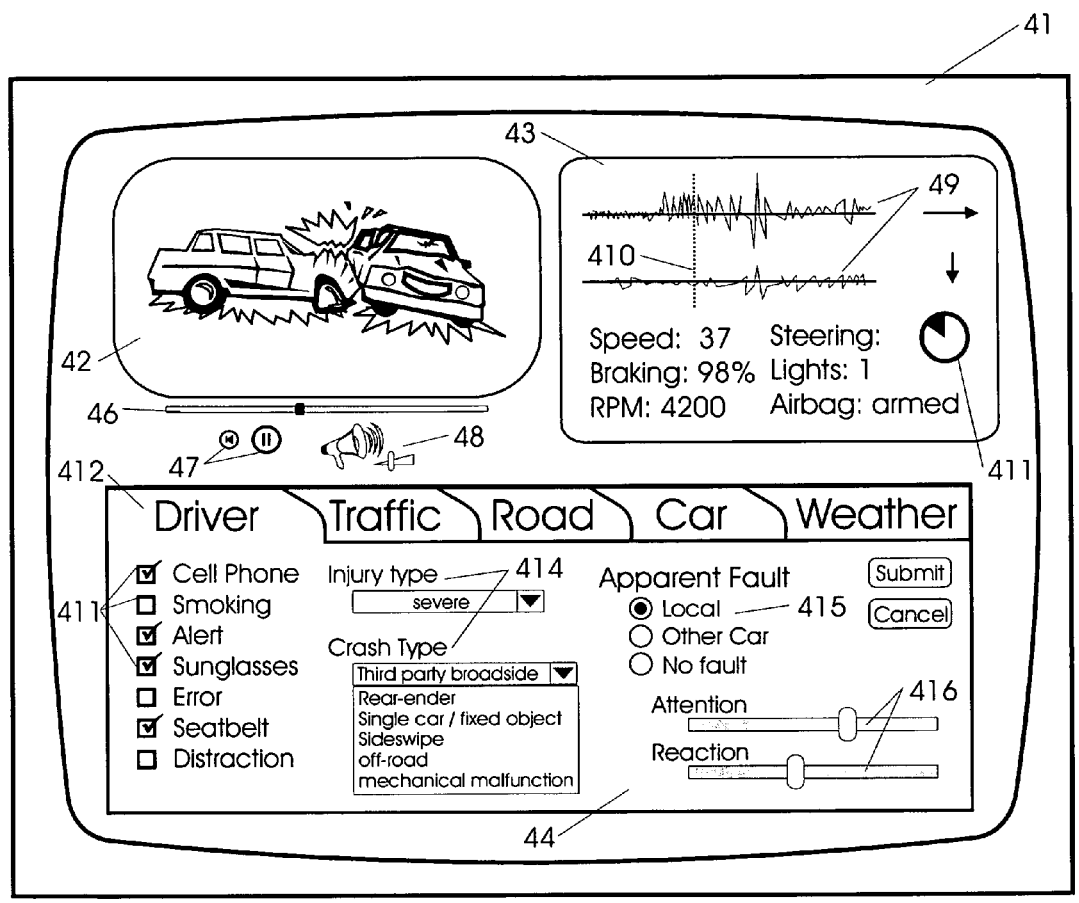
Figure 5:
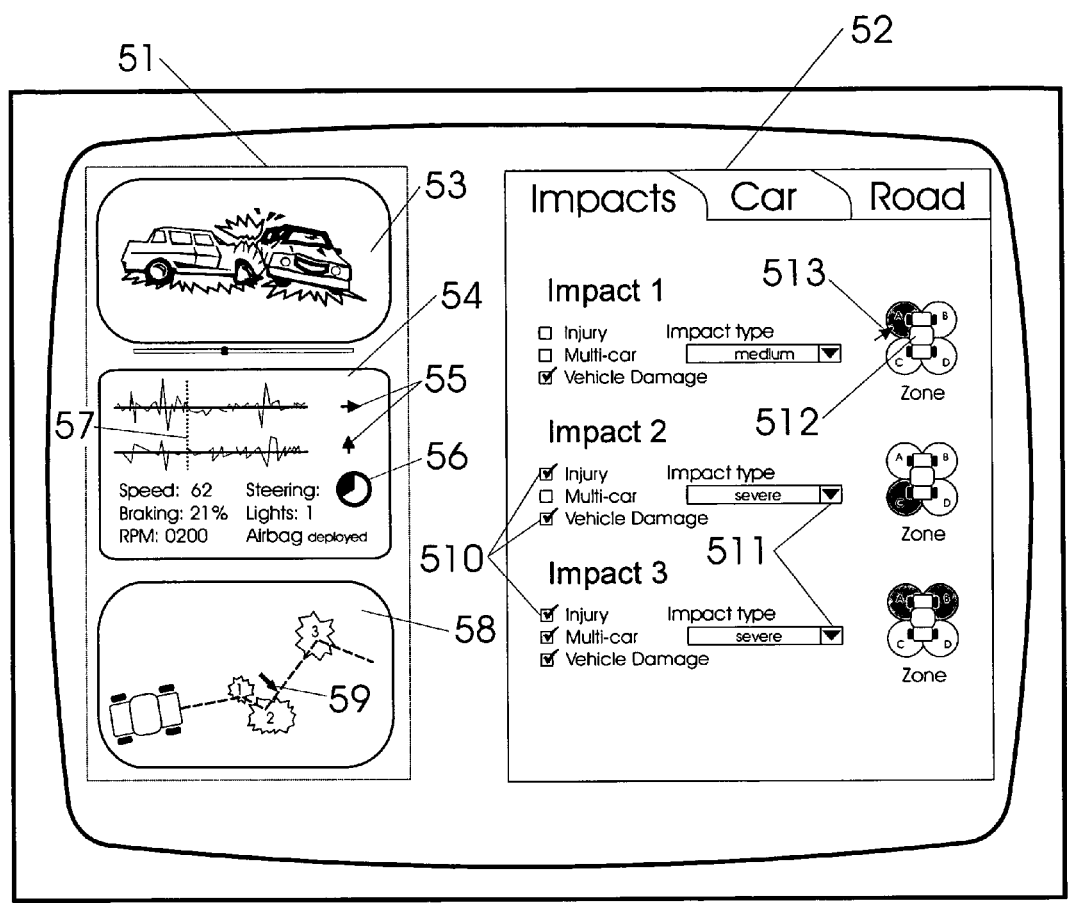
Figure 6:
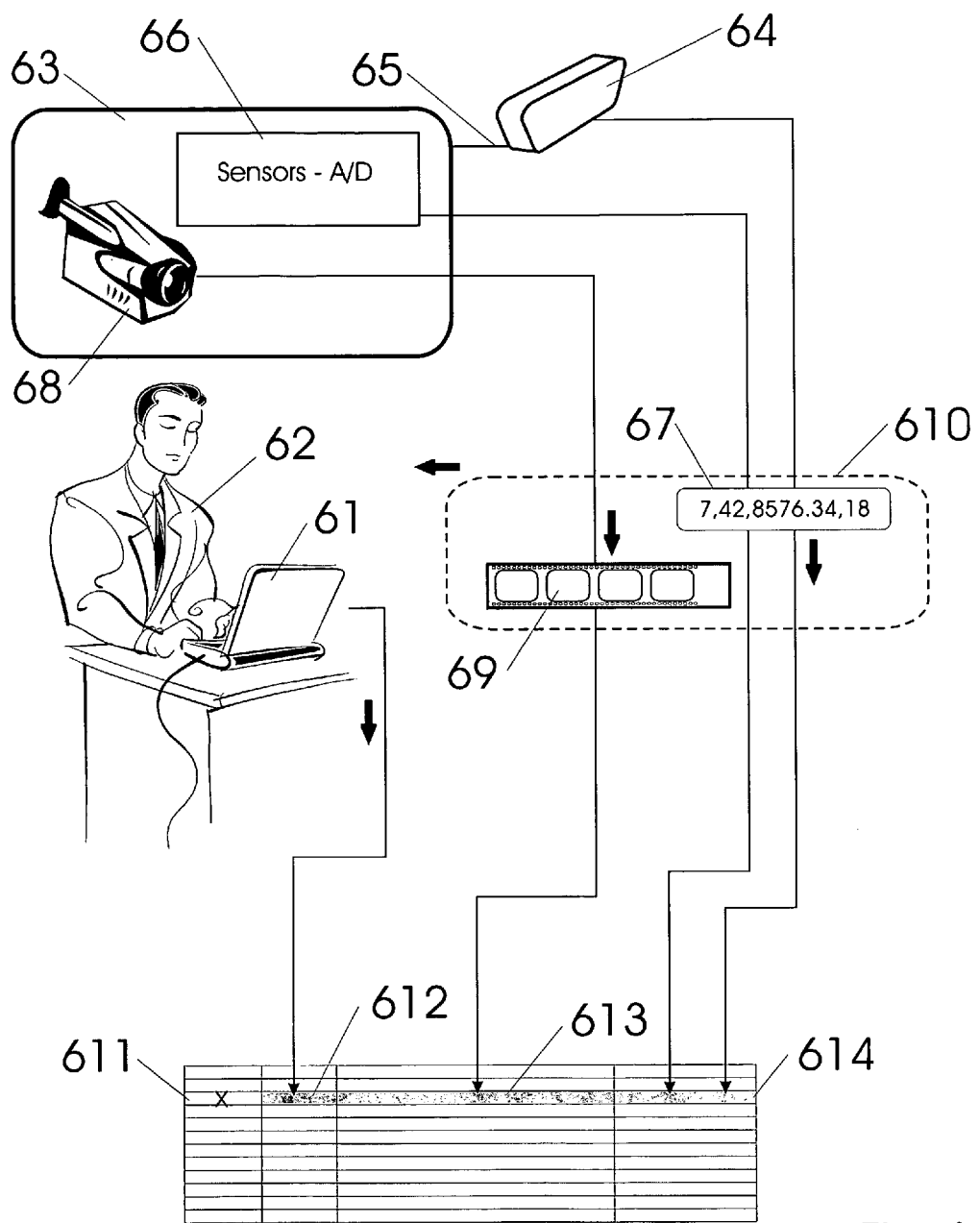
Figure 7:
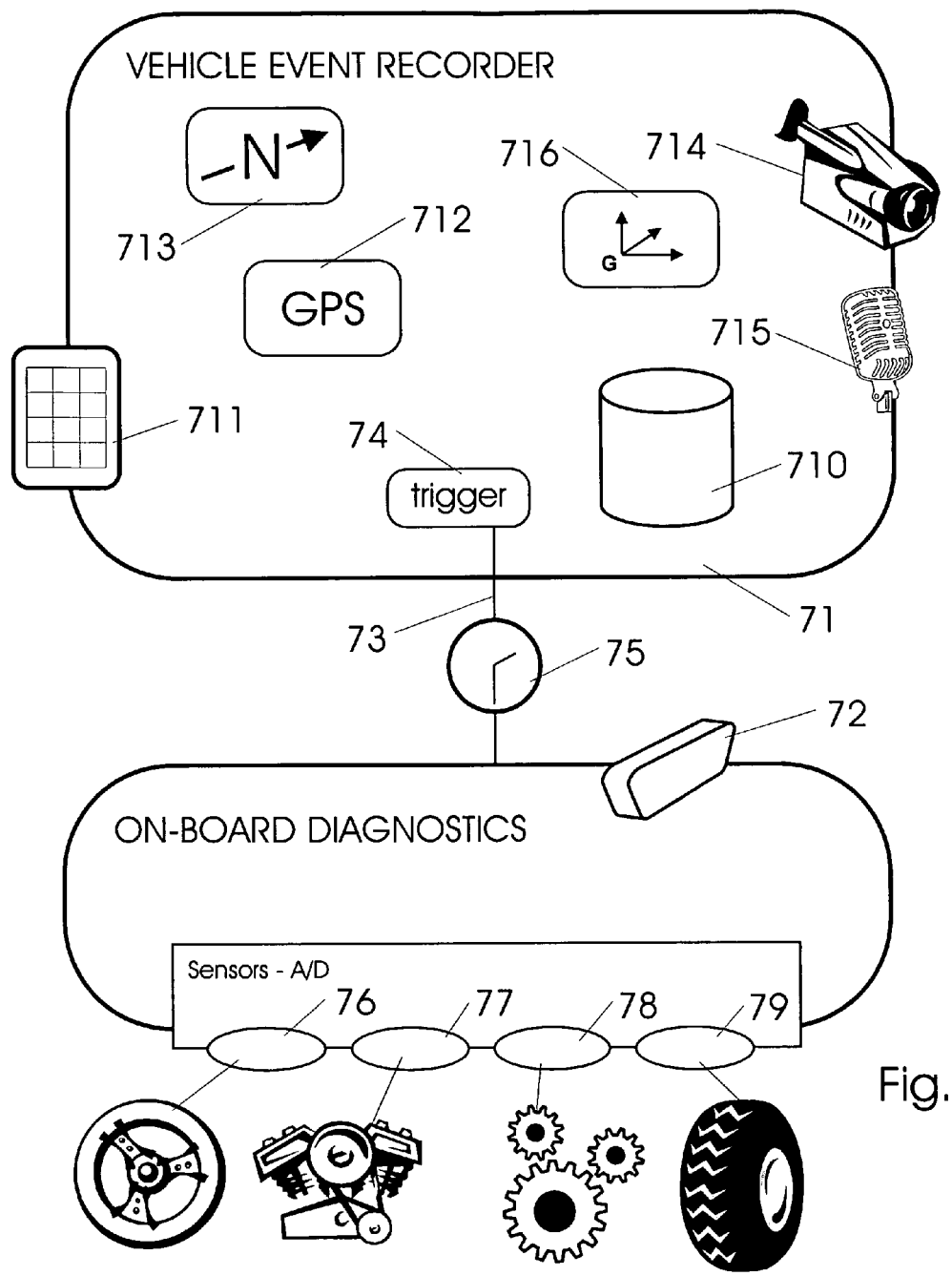
Figure 8:
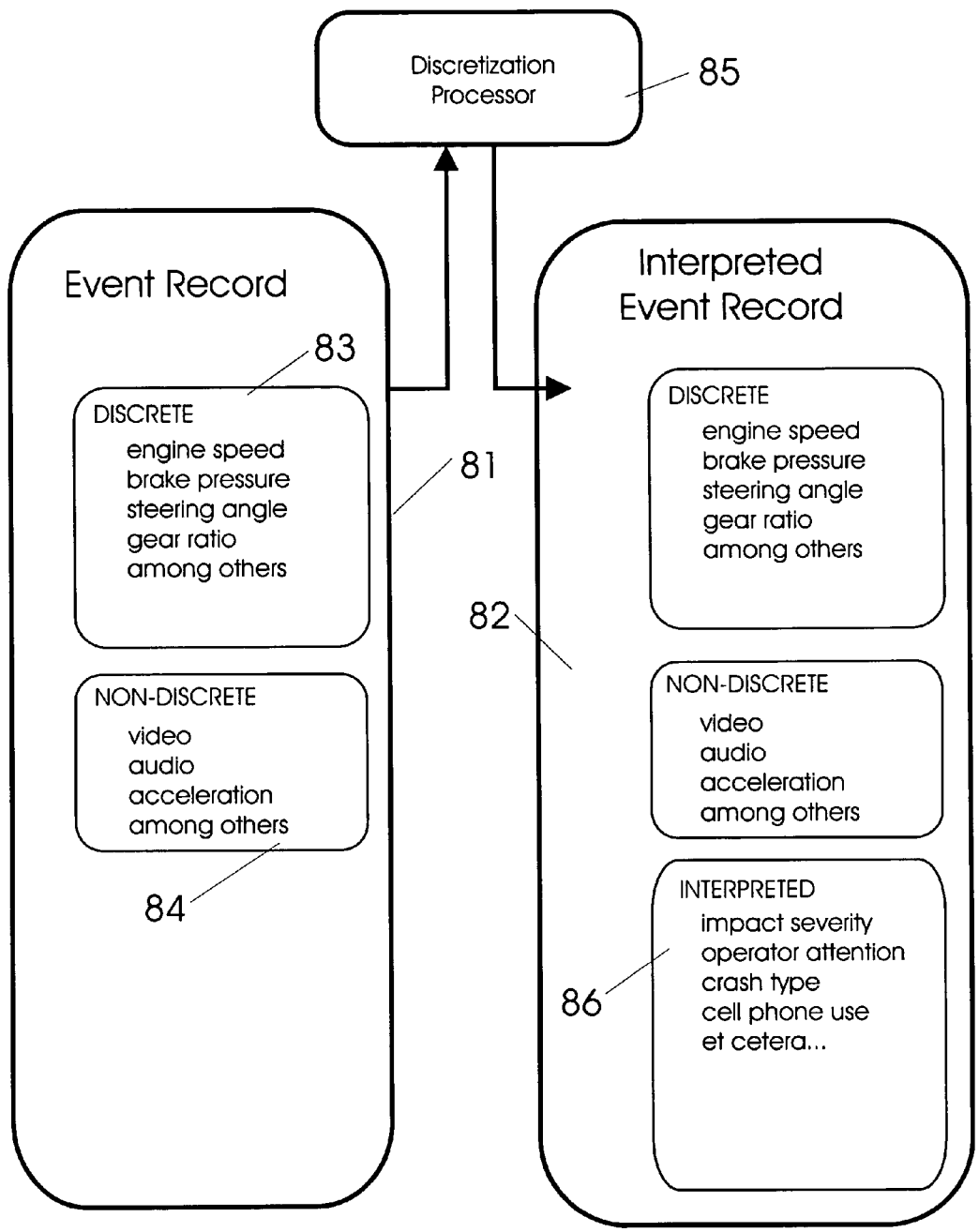
Figure 9:
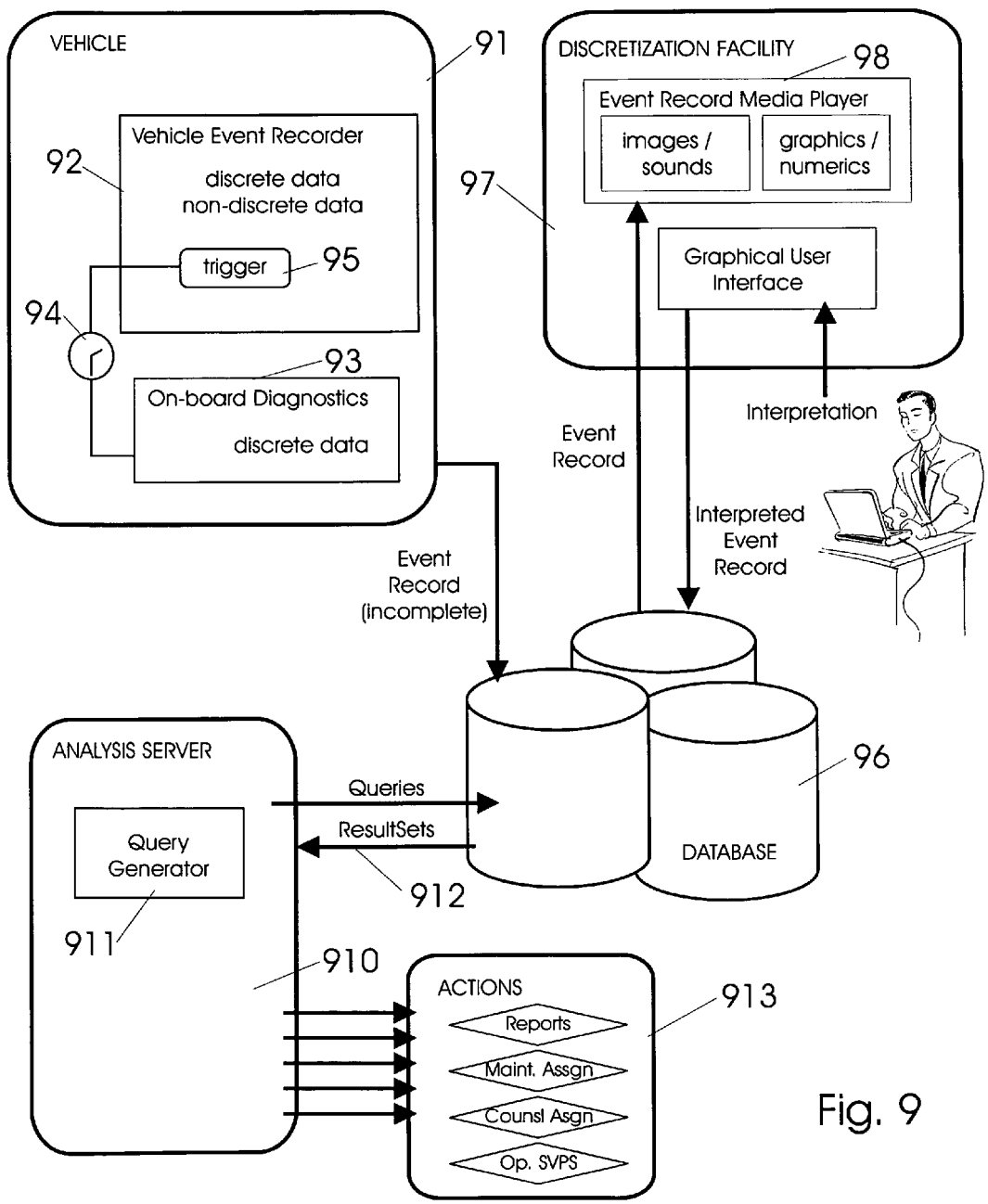

FIG. 3 similarly details these discretization facilities;

FIG. 4 illustrates an example of a display monitor including a graphical user interface couple with a special purpose multi media player;

FIG. 5 suggests an alternative version including special graphical objects;

FIG. 6 illustrates elements of these systems as they relate data types and further to portions of a database record structure;

FIG. 7 is a schematic of a vehicle mounted portion including the various sensors which capture data in an event;

FIG. 8 is a block diagram depicting the structure of an event record contents and their relationships with a discretization facility; and FIG. 9 is a system block diagram overview.

GLOSSARY OF SPECIAL TERMS

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Vehicle Event Recorder

A vehicle event recorder is vehicle mounted apparatus including video recording equipment, audio recording equipment, vehicle system sensors, environmental sensors, microprocessors, application-specific programming, and a communications port, among others. A vehicle event recorder is arranged to capture information and data in response to detection of an abnormal condition or 'exception event'.

Exception Event

An 'exception event' is any occurrence or incident which gives rise to declaration of an 'event' and results in the production of a recorded dataset of information relating to vehicle operator and systems status and performance especially including video images of environments about the vehicle. An exception event is declared via a trigger coupled to either a measured physical parameter which may exceed a prescribed threshold (automatic) or a user who might manipulate a 'panic button' tactile switch (manual).

PREFERRED EMBODIMENTS OF THESE INVENTIONS

In accordance with each of preferred embodiments of these inventions including vehicle exception event management systems are provided. It will be appreciated that each of the embodiments described include an apparatus and the apparatus of one preferred embodiment may be different than the apparatus of another embodiment.

Preferred embodiments of vehicle exception event management systems are particularly characterized as including the following elements. A vehicle event recorder is a vehicle mounted system to capture data relating to vehicle use in response to a trigger or 'exception event'. The vehicle event recorder outputs such data to a database and also to a specially arranged discretization facility for interpretation. The discretization facility may be arranged as a part of a computer network to which the vehicle event recorder is similarly coupled. Output from the discretization facility is carefully coupled to stored event records thus preserving their association with the appropriate event. In this way, stored exception event records are far richer with information developed by both discrete and interpretive systems.

Figure 1:
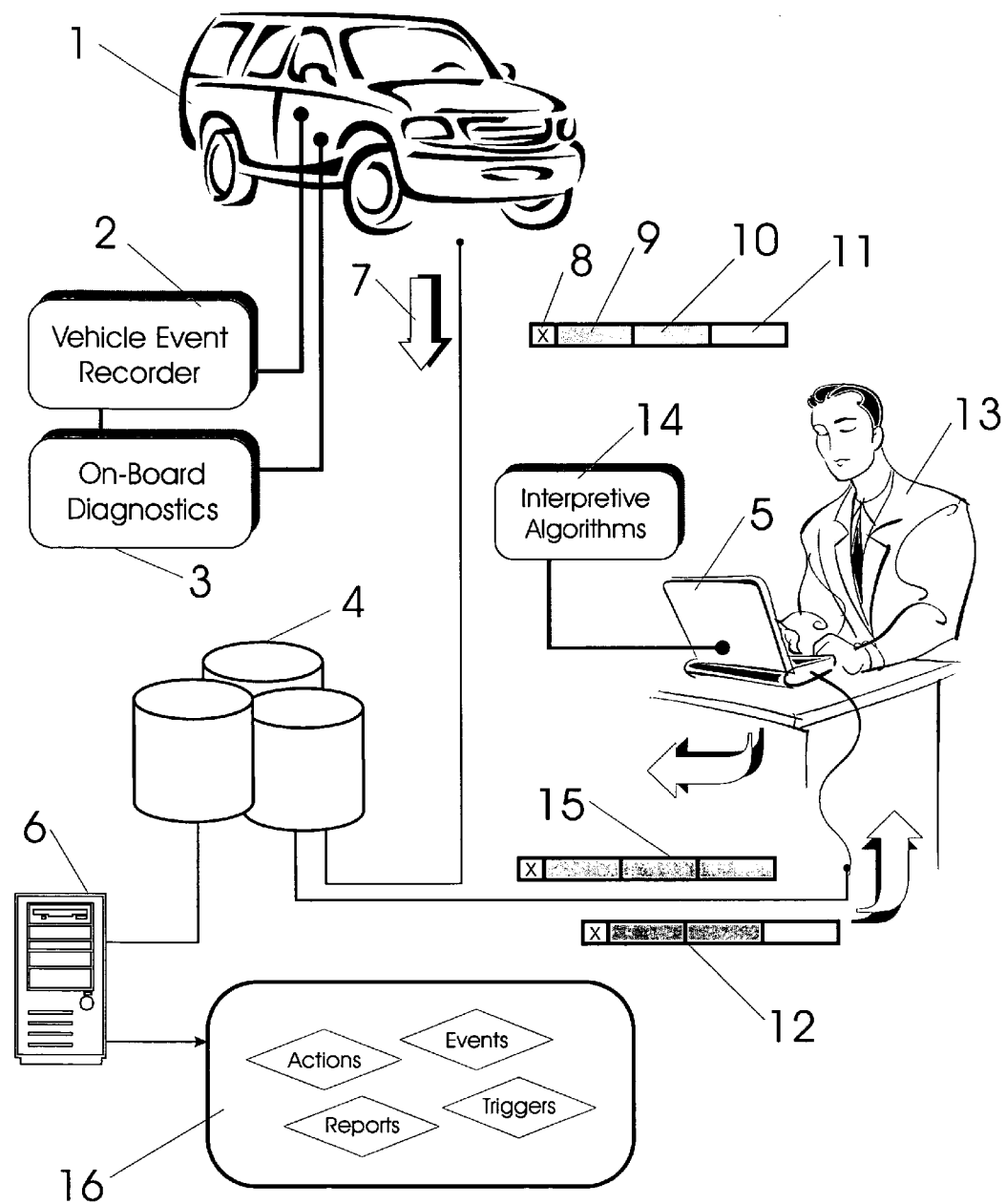
FIG. 1 is schematic drawing of an example exception event management system.

A basic understanding of these systems is realized in view of the drawing figures, in particular the overview illustration of FIG. 1. A common motor vehicle 1 may be provided with systems first presented here. In particular, a vehicle event recorder 2 which includes a video camera, memory, and event trigger such that upon declaration of an exception event, video data relating to the event, more particularly video associated with a period immediately prior to and immediately after an event is recorded to memory for temporary storage. In some versions, an OBD system 3 is also coupled to the event, trigger and memory in a similar fashion whereby data captured in these same periods by the OBD is stored to a memory for further processing.

After a session of normal vehicle use, or 'service period', the vehicle is coupled to a computer network such that data captured and stored in temporary on-board memory can be transferred further into the system components such as a database 4, discretization facility 5, and analysis server 6. In preferred versions, the vehicle may be connected to a system network merely by returning to a predetermined parking facility. There, a data communications link or data coupling between the vehicle mounted vehicle event recorder and a local wireless access point permits data associated with various events which occurred since last download to be downloaded 7 to the system database.

At this stage, a single event data record is allocated for each new event data set and each data record is assigned a unique identifier 8 sometimes known as a primary key. As such, there exists a one-to-one correspondence between events and event data records stored in the database. While an event data record may be comprised of both non-discrete data 9 including video image series; an analog audio recordings; acceleration measurements, for example, and discrete data 10 such as binary indication of headlights on/off; numeric speed values; steering angle indicators; gear ratio indicators, among others, et cetera, the event data record is not complete, or 'preliminary', at this stage. An interpreted portion 11 of the event record remains allocated but empty at this stage. Until a discretization step is taken up at a discretization facility and data is reviewed, analyzed and interpreted to formulate the interpreted data portion, and then added to the event data record, the event data record is only partially complete.

An event data record 12 is passed to a discretization facility. The discretization facility operates to read, analyze and interpret non-discrete data contained in the event data record. In some versions, non-discrete data is processed by advanced computer processes capable of interpretation by applying "fuzzy logic" rules and processing. In other versions, a human interpreter intervenes to read certain non-discrete data and convert it into representative discrete values processable via a machine. In still other versions, both machine and human discretization processes are employed.

Machine processes may be illustrated as interpretation algorithms 14 are applied to video data. Video images subject to image processing routines specifically arranged to "recognize" particular patterns can yield a discrete output. In example, the moment of impact is readily discoverable as a frame-to-frame image tends to greatly change at the moment of impact. Thus, some motion detection routines will be suitable for deciphering the precise moment of impact. Another useful illustrative example includes interpretation of traffic light signals. Image analysis can be applied such that it is determined precisely which traffic light color was indicated as the vehicle approaches an intersection. In even more advanced schemes, the traffic light changes may be automatically quantified by image analysis whereby it can be shown approximately how much time has passed between a light change and an impact. These and other fully automated image processing modules may be implemented as part of a discretization facility which reads non-discrete image data and produces discrete numeric outputs. Of course, an endless number of image recognition algorithms may be arranged to produce discrete output from image interpretation. It is not useful to attempt to enumerate them here and it is not the purpose of this teaching to present new image processing routines. On the other hand, it is the purpose of this disclosure to present new relationships between the vehicle event recorders and the systems which process, store and use data collected thereby and those relationships are detailed here. It is not only video data which might be subject to processing by interpretation modules, but also, audio data and any other non-discrete data captured by a vehicle event recorder.

Audio data may be processed by discretization algorithms configured to recognize the screech of skating tires and the crediting of glass and metal. In this case, discretization of audio data may yield a numeric estimation for speed, time of extreme breaking, and moment of impact et cetera. Again, it is not useful to present detail as to any particular recognition Skeen as many can be envisioned by a qualified engineers without deviation from the scope of the systems presented here. In addition to video and audio types of non-discrete data, acceleration data captured as an analog or not discrete signal may be similarly processed. Mathematical integration applied to acceleration data yields a velocity and position values for any moment of time in the event period.

Besides and in parallel with automated means for interpretive reading of non-discrete data, these discretization facilities also include means for manual interpretive reading of non-discrete data. In some cases, there can be no substitute for the human brain which has a very high interpretive capacity. Accordingly, discretization facilities of these inventions also provides a system which permits a human interpreter to review non-discrete information of an event record, interpret its meaning, and to effect and bring about discrete machine representations thereof. Specifically, a special proprietary media player arranged with particular view to presenting data captured by these vehicle event recorder systems in a dynamic graphical/image presentation over a prescribed timeline. Further, these manual interpretive systems also include simultaneous display of a custom graphical user interface which includes devices for discrete data entry. Such devices or graphical user interface "controls" each are associated with a particular attribute relating to an event/driver/vehicle/environments and each have a range of discrete values as well as a present state value. By reviewing data via the discretization facility media player and manipulating the graphical user interface, a human interpreter generates interpreted data which is discrete in nature. Thus, both automated and manual systems may be used at a discretization facility to produce discrete data from review and interpretation of non-discrete information. The discretization facility output, the interpreted data is then combined with the preliminary event record to form a complete event record 15 and returned to the database for further processing/analysis.

Event records which are complete with discrete, non-discrete, and interpreted data may be interrogated by database queries which depend upon either or all of these data types or combinations of either of them. In systems which do not provide for discretization of non-discrete data, it is impossible to run effective machine based analysis as the processable information is quite limited.

Analysis of so prepared complete event records comprising discrete data, non-discrete data, and interpreted data may be performed to drive automated systems/actions 16 including: maintenance actions (wheel re-alignments in response to impacts characterized as 'curb strike' type collisions for example); occurrence of prescribed events (operator service exceeds 10,000 hours without accidents); triggers (driver violations requires scheduling of counseling meeting); weekly performance reports on drivers/vehicles, among others. Some of these actions are further detailed in sections herefollowing. For the point being made here, it is sufficient to say automated systems are tied to event data which was previously subject to a discretization operation. Analysis servers may run periodic analysis on event data or may run 'on-demand' type analysis in response to custom requests formulated by an administrator.

In this way, these systems provide for advanced analysis to be executed detailed event records which include 'in-part' discretized or interpreted data. Data captured during vehicle use is stored and processed in a manner to yield the highest possible machine access for advanced analysis which enables and initiates a highly useful responses.

Figure 2:
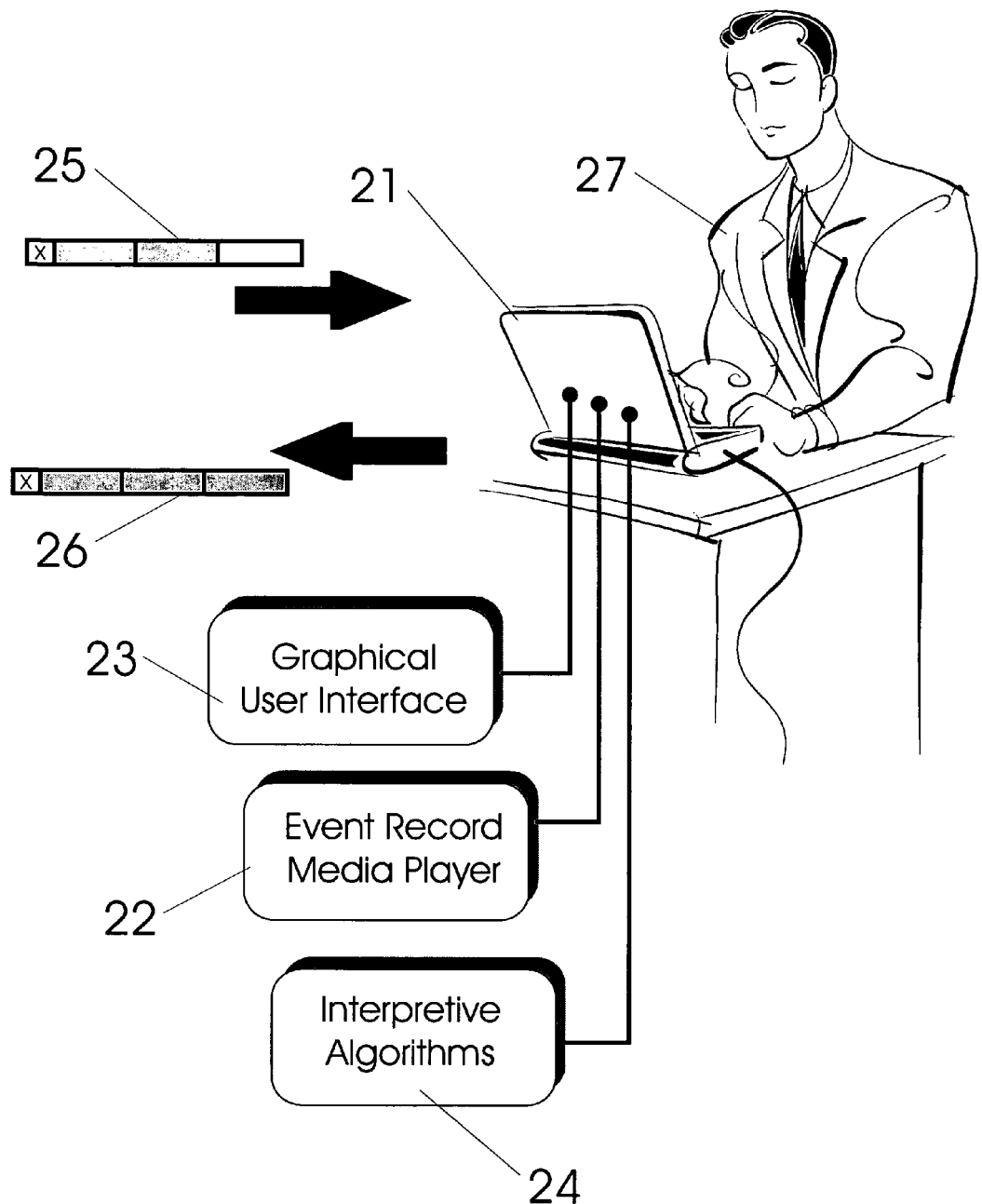
FIG. 2 illustrates in further detail a discretization portion of these systems.

FIGS. 2 and 3 illustrate the discretization facility 21 in isolation and better detail. Arranged as a node of a computer network in communication with system databases, the discretization facility is comprised of primary elements including an event record media player 22 as well as graphical user interface 23. The media player is preferably arranged as a proprietary player operable for playing files arranged in a predetermined format specific to these systems. Similarly, graphical user interfaces of these systems are application specific to support function particular to these systems and not found in general purpose graphical user interfaces. In addition, these discretization facilities may optionally include algorithm based interpretive algorithm systems 24 which read and interpret non-discrete data to provide a discrete interpreted output. A discretization facility receives as input a preliminary event record 25, the event record comprising at least a portion of data characterized as non-discrete. In example, a video or audio recording is non-discrete data which cannot be used in mathematical analysis requiring discrete inputs. After being processed by the discretization facility, an event record 26 is provided as output where the event record includes a newly added portion of interpreted data being characterized as discrete. In some cases, a human operator interacting with the graphical user interface and media player is means of creating the interpreted data.

This process is further illustrated in FIG. 3 which shows media player data inputs as well as an example of a graphical user interface. A discretization facility 31 is embodied as major elements including event record media player 32 and custom graphical user interface 33. Data produced by a vehicle event recorder and an on-board diagnostics system is received at the discretization facility and this data arrives in a format and structure specifically designed for these systems. Specifically, a timeline which synchronously couples video data and OBD data assures a display/viewing for accurate interpretation. This is partly due to the specific nature of the data to be presented. Common media player standards do not support playing of certain forms of data which may be collected by a vehicle event recorder and on-board diagnostics systems, for example Windows™ Media Player cannot be used in conjunction with data captured in a motor vehicle; Windows™ Media Player takes no account of data related to speed, acceleration, steering wheel orientation, et cetera. In contrast, data specific to these exception event recording systems include: digital and numeric data 34 formed by sensors coupled to vehicle subsystems, as well as more conventional audio data 35 recorded at an audio transducer. These may include operator compartment microphones as well as microphones arranged to receive and record sounds from the vehicle exterior. Acceleration data 36, i.e. the second derivative of position with respect to time, may be presented as continuous or non-discrete data subject to interpretation. Video data 37 captured as a series of instantaneous frames separated in time captures the view of environments about the vehicle including exterior views especially forward views of traffic and interior views, especially views of a vehicle operator. Each of these types of data may be subject to some level of interpretation to extract vital information.

Some examples are illustrated as follows. Some vehicle collision type events include complex multiple impacts. These multiple impacts might be well fixed objects like trees and road signs or may be other vehicles. In any case, a microphone which captures sounds from a vehicle exterior may produce an audio recording which upon careful review and interpretation might contribute to a detailed timeline as to various impacts which occur in the series. Numeric data which indicates an operators actions such as an impulse braking action, swerve type extreme steering action, et cetera, may be considered in conjunction with an event record timeline to indicate operator attention/inattention and other related response factors. Accelerometer data can be used to indicate an effective braking action, for example. Acceleration data also gives information with respect to a series of impacts which might accompany an accident. Acceleration data associated with orthogonal reference directions can be interpreted to indicate resulting direction of travel collisions. Mathematical integration of acceleration data provides precise position and velocity information as well. Video images can be played back frame-by-frame in slow motion to detect conditions not readily otherwise measured by subsystem sensors. It human reviewer particularly effective at determining the presence certain factors in an event scene. As such, media players of these systems are particularly arranged to receive this data as described and to present it in a logical manner so a human reviewer can easily view or "read" the data. While viewing an event playback, an interpreter is also provided with a special graphical user interface which permits easy quantification and specification to reflect various attributes which may be observed or interpreted in the playback. A human operator may manipulate graphical user interface controls 38 to set their present state values. These controls and each of them have a range of values and a present state value. The present state value is adjusted by an operator to any value within the applicable range. The present state value of each control is coupled to the database via appropriate programming such that the database will preserver the present state value of the control and transfer it as part of an event record stored in long term memory.

An example of graphical user interfaces effected in conjunction with event record type media players is illustrated further in FIG. 4 which together fill an image field 41, for example that of a computer workstation monitor. The first portion of the image field may be arranged as an event video player 42. Video images captured by a vehicle event recorder may be replayed at the player to provide a detailed visual depiction of the event scene. A video series, necessarily having an associated timeline, may be replayed on these players in several modes including either: fast forward, rewind, slow motion, or in actual or 'real-time' speed, among others as is conventional in video playback systems. A second portion, a graphical display field 43 of the display field may be arranged to present graphical and numeric information. This data is sometimes dependent upon time and can be presented in a manner whereby it changes in time with synchronization to the displayed video images. For example, a binary indication of the lights status may be presented as "ON" or "1" at the first video frame, but indicated as being "off" or "0" just after a collision where the lights are damaged and no longer drawing current as detected by appropriate sensors. Another area of the display field includes a graphical user interface 44. A "tab strip" type graphical user interface control is particularly useful in some versions of these systems. Graphical user interface controls may be grouped into logically related collections and presented separately on a common tab. A timeline control 46 permits an interpreter to advance and to recede the instant time at will by sliding a pip along the line. "Start" and "stop" playback controls 47 can be used to freeze a frame or to initiate normal play. Similarly, controls may additionally include fast forward, rewind, loop, et cetera. Control interface 48 to adjust audio playback (volume) are also part of these media players. It is important to note that the graphical presentations of display field 43 are strictly coupled to the video with respect to time such that frame-by-frame, data represented there indicates that which was captured at the same incident a video frame was captured. Sometimes information presented is represented for the entire event period. For example, it is best to show force data 49 for the entire event period. In this case, a "present instant" reference line 410 is used to indicate the moment which corresponds with the video frame capture. It is easy to see that conventional media players found in the art are wholly unsuitable for use in these systems. Those media players do not account for presentation of event data with synchronization to a video timeline. For example the graphical representation of instantaneous steering wheel orientation angle 411, instantaneous speed. Media players of the art are suitable for display of video simultaneously with a data element such as air temperature area air temperature does not appreciably change in time so there exists no synchronization with the video frames. However, when presented data is collected via sensors coupled to a vehicle subsystems and is synchronized with the video, the media player is characterized as an event record media player ERMP and constitutes a proprietary media player. Further, this specialized media player is an exceptionally good tool for reading and presenting an event intuitively and in detail as it provides a broad information base from which detailed and accurate interpretations may be easily made. While a few interesting and illustrative examples of data types are presented in the data display field, it should be appreciated that a great many other types not shown here are examples may also be included in advanced systems. As it is necessary for a clear disclosure to keep the drawing easily understandable, no attempt is made to show all possible data factors which might be presented in a data display field of these systems. Indeed there may be many hundreds of parameters captured at the vehicle during an event which might be nicely displayed in conjunction with a frame-by-frame video of the event. One should realize that each particular parameter may contribute to a valuable understanding of the event but that it is not mentioned here is no indication of its level of importance.

What is important and taught here, is the notion that a better interpretive platform is realized when any time dependent parameter is played back in a pleaded display field in conjunction with the video where synchronization between the two is effected.

The ERMP, so defined in the paragraphs immediately prior, is preferably presented at the same time with graphical user interface 44. Graphical user interfaces are sometimes preferably arranged as a tab strip. For example, a "Driver" tab 412 may have controls associated therewith which relate specifically to driver characterizations. Various graphical user interface control element types are useful in implementations of these graphical user interface systems; checkboxes 413, drop-down listboxes 414, radio buttons 415, sliders 416, command buttons, et cetera, among others. Checkboxes may be used indicate binary conditions such as whether or not a driver is using a cell phone, is smoking, is alert, wearing sunglasses, made error, is using a seat belt properly, is distracted, for example. It is easily appreciated that these are merely illustrative examples, one would certainly devise many alternative and equally interesting characterizations associated with a driver and driver performance in fully qualified systems. Again these are provided merely for illustration of graphical user interface controls.

One will easily see however, their full value in consideration of the following. To arrange a physical detector which determines whether or not a driver is wearing sunglasses is a difficult task indeed; possible but very difficult. Conversely, in view of these systems which permit discretization of such driver characteristics including the state of her sunglasses, that is these systems which arrive at a discrete and thus computer processable expression of this condition, the detailed nature of an event is realized quite readily. By a simple review of an event video, an interpreter can make the determination that a driver is wearing sunglasses and indicate such by ticking an appropriate checkbox. As the checkbox, and more precisely it present state value, is coupled to the specific event record, information is passed to and stored in the database and becomes processable by computer algorithms. Previously known systems do not accommodate such machine processable accounts various information usually left in a non-discrete form if captured at all. A fleet manager can thereafter form the query: "what is the ratio of noon hour accident type events where drivers were wearing sunglasses versus these with drivers not wearing sunglasses". Without systems first presented here, such information would not available without an extremely exhaustive labor intensive examination of multiple videos.

Of course, these systems are equally useful for information which is not binary, yet still discrete. A listbox type control may provide a group having a discrete number of distinct members. For example a "crash type" list box containing five elements ('values') each associated with a different type of crash may be provided where a reviewer's interpretation could be expressed accordingly. For example, a "sideswiped" crash could be declared after careful review of the media player data and so indicated in the drop-down listbox member associated with that crash type. Of course, it is easy to appreciate the difficulty of equipping a car with electronic sensors necessary to distinguish between a "sideswipe" type crash and a "rear-ender" crash. Thus, a considerable amount of information collected by a video event recorder is non-discrete and not processable by automated analysis until it has been reduced to a discrete form in these discretization facilities. These systems are ideal for converting non-discrete information into processable discrete (interpreted) the dataset to be connected with the event record in an electronic database and data structure coupled to the controls of the graphical user interface. Analysis executed on such complete event records which include interpreted data can be preformed to trigger dependent actions.

Another useful combination version of an event record media player 51 and custom graphical user interface 52 is illustrated in FIG. 5. In this version, an ERMP includes three fields coupled together via an event timeline. An image field 53 is a first field arranged to show video and image data captured via any of the various cameras of a vehicle event recorder. A numeric or graphical field 54 is arranged to represent non-image data captured at a vehicle event recorder during an event. Some presentations of this data may be made in a graphical form such as arrow indicators 55 to indicate acceleration direction and magnitude; the wheel graphical icon 56 to indicate the steering wheel orientation angle. Presenting some numeric data in graphical form may aid interpreters to visualize a situation better; it is easy to appreciate the wheel icon expresses in a far more intuitive way than a mere numeric value such as "117°". "Present instant" indicator 57 moves in agreement (synchronously) with the event timeline and consequently the displayed image frame. In this way, the ERMP couples video images of an event record with numeric data of the same event. Another graphical field 58, an icon driven image display indicates a computed path of a vehicle during an event and further illustrates various collisions as well as the severity (indicated by size of star balloon) associated with those collisions. The graphic additionally includes a "present instant" indication 59 and is thereby similarly coupled to the video and more precisely the event timeline common to all three display fields of the ERMP. This graphic aids an interpreter in understanding of the event scenario details with particular regard to events having a plurality of impacts.

In response to viewing this ERMP, an interpreter can manipulate the graphical user interface provided with specific controls associated with the various impacts which may occur in a single event. For illustration, three impacts are included in the example represented. Impact 1 and 2 coming close together in time, impact 1 being less severe than impact 2, impact 3 severe in intensity, coming sometime after impact 2. By ticking appropriate checkboxes, an interpreter specifies the details of the event as determined from review of information presented in the ERMP. By using drop-down list boxes 511, the interpreter specifies the intensity of the various impacts. Special custom graphical control 512, a nonstandard graphical user interface control graphically presents a vehicle and four quadrants A,B,C,D, where an interpreter can indicate via mouse clicks 513 the portion of the vehicle in which the various impacts occur. In this way, graphical user interface 52 is used in conjunction with ERMP 51 to read and interpret both non-discrete and discrete data captured by a vehicle event recorder and to provide for discretization of those interpretations by graphical user interface controls each dedicated to various descriptors which further specify the accident. Experts will appreciate that a great plurality of controls designed to specify event details will finally come to produce the most useful systems; it is not the purpose of this description to present each of those controls which may be possible. Rather, this teaching is directed to the novel relationships between unique ERMPs and graphical user interfaces and further, discretization facilities in combination with a vehicle mounted vehicle event recorders and database and analysis systems coupled therewith.

FIG. 6 illustrates further relationships between data source subsystems and data record structure. In particular, those operable for capture of data both non-discrete and discrete in nature, and those subsystems operable for converting captured non-discrete data to discrete data.

Attention is drawn to discretization facility 61 which may include image processing modules such as pattern recognition systems. In addition, these discretization facilities include a combination of specialized event record media player as well as custom graphical user interface. Alternatively, a human operator 62 may view image/audio/numeric and graphical data to interpret the event details and enter results via manipulation of graphical user interface controls. In either case, the discretization facility produces an output of machine processable discrete data related to the non-discrete input received there.

Event data is captured and recorded at a vehicle event recorder 63 coupled to a vehicle subsystems, and vehicle operating environments. In some preferred versions, an on-board diagnostics system 64 is coupled 65 to the vehicle event recorder such that the vehicle event recorder trigger operates to define an event. An on-board diagnostics system usually presents data continuously, however, in these event driven systems, on-board diagnostics data is only captured for a period associated with an event declaration. As described herein the vehicle event recorder produces both numeric/digital data as well as non-discrete data such as video and audio streams. Specifically, transducers 66 coupled to vehicle subsystems and analog to digital converters, A/D, produce a discrete data 67. Some of this discrete data comes from the on-board diagnostics system and some comes from subsystems independent of on-board diagnostic systems. Further, a video camera 68 produces video image series or non-discrete data 69. A copy 610 of these data, including both discrete and non-discrete, is received at the discretization facility for interpretation either by a computer interpretive algorithms or by operator driven schemes. All data, however so created, is assembled together and associated as a single unit or event record in a database structure which includes a unique identifier or "primary key" 611. Interpreted data 612 output from the discretization facility (i.e. the value of graphical user interface controls) is included as one portion of the complete event record; a second portion is the non-discrete data 513 captured by the vehicle event recorder; and a third portion of the event record is the discrete data 514 captured in the vehicle event recorder and not created as a result of an interpretive system.

It is useful to have a closer look at vehicle mounted subsystems and their relationship with the vehicle event recorder and the on-board diagnostics systems. FIG. 7 illustrates a vehicle event recorder 71 and an on-board diagnostics system 72 and coupling 73 therebetween. Since an event is declared by a trigger 74 of the vehicle event recorder, it is desirable when capturing data from the on-board diagnostics system that the data be received and time stamped or otherwise synchronized with a system clock 75. In this way, data from the on-board diagnostics system can be properly played back with accurate correspondence between the on-board diagnostics system data and the video images which each have an instant in time associated therewith. Without this timestamp, it is impossible to synchronize data from the on-board diagnostics system with data from the vehicle event recorder. An on-board diagnostics system may include transducers coupled to vehicle subsystems, for example the steering system 76; engine 77 (such as an oil pressure sensor or engine speed sensors); the transmission 78 (gear ratio) and brakes system 79, among others. Today, standard on-board diagnostics systems make available diagnostic data from a great plurality of vehicle subsystems. Each of such sensors can be used to collect data during an event and that data may be preserved at a memory 710 as part of an event record by the vehicle event recorder. The vehicle event recorder also may comprise sensors independent of the on-board diagnostics system also which capture numeric and digital data during declared events. A keypad 711 is illustrative. A keypad permits a vehicle operator to be associated with a system via a "login" as the operator for an assigned use period. A global positioning system receiver 712 and electronic compass 713 similarly may be implemented as part of a vehicle event recorder, each taking discrete measurements which can be used to characterize an event. In addition to systems which capture discrete data, a vehicle event recorder also may include systems which capture data in a non-discrete form. Video camera 714, microphone 715, and accelerometers set 716 each may be used to provide data useful in interpretive systems which operate to produce discrete data therefrom. While several of each type of data collection system is mentioned here, this is not intended to be an exhaustive list. It will be appreciated that a vehicle event recorder may include many additional discrete and non-discrete data capture subsystems. It is important to understand by this teaching, that both discrete and non-discrete data are captured at a vehicle event recorder and that discrete data may be captured at an on-board diagnostics system and these data capture operations are time stamped or otherwise coupled in time to effect a synchronization between the two.

FIG. 8 illustrates the relationship between a preliminary event record 81 as taken by on-board hardware in comparison to a complete event record 82 which includes an interpreted data portion having discrete, computer processable data therein. In this way, advanced algorithms may be run against the complete event record to more effectively control and produce appropriate fleet management actions.

An event record produced by vehicle mounted systems includes both a discrete data portion 83 and a non-discrete data portion 84. Data associated with a particular declared event is captured and sent to a discretization facility 85 for processing. At the discretization facility, non-discrete data is read either by humans or machines in interpretive based systems and an interpreted data portion 86 is produced and amended to the original event record to arrive at a complete event record.

Finally FIG. 9 presents in block diagram a system review. Primary system elements mounted in a motor vehicle 91 include a vehicle event recorder 92 and optionally an on-board diagnostics system 93. These may be linked together by a system clock 94 and a vehicle event recorder event trigger 95. Together, these systems operate to capture data which may be characterized as discrete and that which is characterized as non-discrete, the data relating to a declared event and further to pass that capture data to a database 96. A discretization facility 97 is comprised of an event record media player 98 where data may be presented visually in a time managed system. A discretization facility further includes a graphical user interface 99 which a system operator may manipulate to effect changes to a present value state of a plurality of controls each having a value range. These control values are coupled to the database and more specifically to the data record associated with an event being played at the media player such that the data record thereafter includes these control values which reflect interpretations from the discretization facility. An analysis server 910 includes query generator 911 which operates to run queries against event data stored in the database, the queries at least partly depending on the interpreted data stored as part of complete event record. Result sets 912 returned from the database can be used in analysis systems as thresholds which trigger actions 913 to be taken up in external systems. For example upon meeting some predefined conditions, special reports 914 may be generated and transmitted to interested parties. In other systems, vehicle maintenance scheduling/operations may be driven by results produced partly based upon interpreted data in the complete event record.

In review, systems presented here include in general, vehicle exception event management systems. Exception events are for example either of: crash; accident; incident; et cetera. These management systems primarily are comprised of the following subsystem components including: a vehicle event recorder; a discretization facility; and a database. The vehicle event recorder includes a video recorder or camera with a field-of-view directed to environments, for example a forward traffic view, or a rearward vehicle operator view. These video cameras are set to capture video images whenever a system trigger declares the occurrence of an event. The discretization facility is a node of a computer network which is communicatively connected to the vehicle event recorder. In this way, data may be transferred from the vehicle event recorder to the discretization facility. The discretization facility is also in communication with the database such that discrete data is generated at the discretization facility and provided as output and further transferred from the discretization facility to the database in accordance with an appropriate structure.

The discretization facility of these vehicle exception event management systems includes two very important subsystem elements including a media player and a graphical user interface. Preferably displayed simultaneously at a single monitor, a media player receives captured data from the vehicle event recorder and re-plays the data in a prescribed format and design at the monitor such that an interpreter can consider and interpret various aspects of the recorded information.

On the same monitor and at the same time, a graphical user interface having several control elements with a range of discrete value states may be presented in a way where the user can manipulate the values associated with each control—i.e. via mouse click actions. Finally, the graphical user interface controls are coupled to the database such that their values are transferred to the appropriate database record associated with the event represented at the monitor by the media player and graphical user interface so manipulated. A discretization facility may also include a tactile device, such as a computer 'mouse' wherein a human operator may manipulate present value states of graphical user interface control elements.

These media players are distinct as they accommodate various data types not present in other media player systems. These systems also play several data types at the same time. Thus, they are 'multi-media' players and include subsystems to replay and present video, audio, and other exception event data; i.e. all that data associated with an event recordset.

Media players of these event management systems have three distinct display field portions. These include: a video field portion, a graphics field portion and a text field portion. Video images, either one or more, are presented in the video field portion. In some cases, the field portion is divided into several different view fields to accommodate video from different cameras of the same video event recorder. All three display fields are synchronized together via a common timeline. Various data captured in a vehicle event recorder is time stamped so that it can be replayed synchronously with other data. In this regard, it is said that video fields, graphic fields and text fields are coupled by a common event timeline.

Replay of data is controlled by way of special timeline controls of the media player. That is, the media player timeline controls permit playback functions described as: replay;

rewind; slow motion; fast forward; and loop play. When a timeline is being played in a forward direction, audio may accompany video and graph information via a system speaker.

Graphics fields of these media players may include at least one dynamic graphic element responsive to data in the event dataset; graphical representation of data sometimes aids in its comprehensive interpretation.

A graphics field may be arranged to include for example a plot of force verses time; sometimes referred to as 'G-force' or 'acceleration forces' these are the forces which act on a vehicle as it advances through the event period. In best versions, the graphics field comprises two plots of force, each plot being associated with crossed or orthogonal directions. Another useful example of a graphical representation of event data is a graphics field element having a dynamic representation of steering wheel position.

Text fields may be provided in these graphical user interfaces to include at least one dynamic text element responsive to data in an event dataset. A text field may further include at least one text element which characterizes an exception event, the characterization being related to some attribute of the vehicle or operator or environmental condition.

Finally, these systems may also include an analysis server coupled to the database wherein machine processable commands may be executed against data stored in the database. Machine processable commands include prescribed queries which may be executed periodically.

One will now fully appreciate how systems may be arranged to process, interpret and analyze data collected in conjunction with vehicle event recorders. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A vehicle exception event management system comprising:
    a vehicle event recorder mounted in a vehicle, the vehicle event recorder configured to:
        responsive to a detected vehicle event, capture and save vehicle event information, the vehicle event information including non-discrete sensory data and discrete quantitative data related to operation of the vehicle during the detected vehicle event, the vehicle event recorder configured to save the discrete quantitative data and the non-discrete sensory data in preliminary event records such that, responsive to a first detected vehicle event, the vehicle event recorder saves first discrete quantitative data and first non-discrete sensory data in a first preliminary event record; and
        transmit the vehicle event records to a discretization system;
    the discretization system configured to determine discrete quantitative data from the non discrete sensory data, the discretization system comprising:
        one or more physical computer processors configured to determine second discrete quantitative data automatically based on at least one of predetermined logic rules or predetermined algorithms from at least a first portion of the first non-discrete sensory data; and
        a user interface configured to facilitate manual interpretation of at least a second portion of the first non-discrete sensory data by a human interpreter, the user interface configured to receive one or more of entry or selection of manual interpretation information from the human interpreter, the one or more physical computer processors configured to determine third discrete quantitative data based on the manual interpretation information; and
    a database configured to electronically store the first discrete quantitative data, the first non-discrete sensory data, the second discrete quantitative data, and the third discrete quantitative data in a first complete event record and facilitate access to the first complete event record by a remote computing device associated with an end user for analysis by the end user.

2. The vehicle exception event management system of claim 1, wherein the vehicle event recorder includes one or more video cameras having fields-of-view that include environments about the vehicle and one or more sensors configured to generate output signals that convey information related to the operation of the vehicle,
    wherein the non-discrete sensory data includes video information recorded by the one or more video cameras, and
    wherein the discrete quantitative data includes information conveyed by the output signals from the one or more sensors.

3. The vehicle exception event management system of claim 2, wherein the user interface of the discretization system includes:
    a media player configured to replay the video information recorded by the one or more video cameras, and
    a graphical user interface comprising a plurality of control elements, the control elements having a range of discrete value states that are settable by the human interpreter.

4. The vehicle exception event management system of claim 3, said media player is characterized as a multi-media player comprising subsystems to replay and present recorded event datasets comprising video and audio data.

5. The vehicle exception event management system of claim 4, said media player comprises display field portions including field portions characterized as one or more of video fields, graphics fields, or text fields.

6. The vehicle exception event management system of claim 5, wherein said video fields, graphic fields and text fields are coupled to a common event timeline.

7. The vehicle exception event management system of claim 6, said media player further comprises a speaker wherein an audio signal provided to the speaker is synchronized with the common event timeline.

8. The vehicle exception event management system of claim 5, said video fields include at least one view corresponding to the viewpoint of a vehicle event recorder video camera.

9. The vehicle exception event management system of claim 8, wherein said video fields include a plurality of individual views, the individual views corresponding to individual vehicle event recorder cameras.

10. The vehicle exception event management system of claim 5, said graphics fields comprising at least one dynamic graphic element responsive to data in the preliminary event record.

11. The vehicle exception event management system of claim 10, said graphics fields comprising a dynamic graphics element arranged as a plot of force verses time.

12. The vehicle exception event management system of claim 10, said graphics fields comprising two plots of force, a first plot associated with a first direction that is orthogonal to a second direction associated with a second plot.

13. The vehicle exception event management system of claim 10, said graphics fields comprising a dynamic graphic representation of steering wheel position.

14. The vehicle exception event management system of claim 5, said text fields comprise at least one dynamic text element responsive to data in the preliminary event record.

15. The vehicle exception event management system of claim 14, said text fields comprising at least one text element which characterizes an exception event, the at least one text element related to one or more of vehicle speed, engine speed, seatbelt status, steering position, airbag status, or braking status.

16. The vehicle exception event management system of claim 3, wherein the graphical user interface includes timeline control elements.

17. The vehicle exception event management system of claim 16, wherein said timeline control elements include one or more of replay; rewind; slow motion; fast forward; or loop.

18. The vehicle exception event management system of claim 3, wherein the user interface is configured to display the graphical user interface and said media player simultaneously.

19. The vehicle exception event management system of claim 18, wherein the user interface further comprises a tactile device wherein a human operator may manipulate the present value states of graphical user interface control elements.

20. The vehicle exception event management system of claim 1, further comprising an analysis server coupled to said database wherein machine processable discretization commands are executed against data stored in the database.

\* \* \* \* \*